No. 755,194. PATENTED MAR. 22, 1904.
T. VICARS & J. VICARS, THE YOUNGER.
TRAVELING OVEN.
APPLICATION FILED SEPT. 15, 1903.
NO MODEL. 5 SHEETS—SHEET 2.

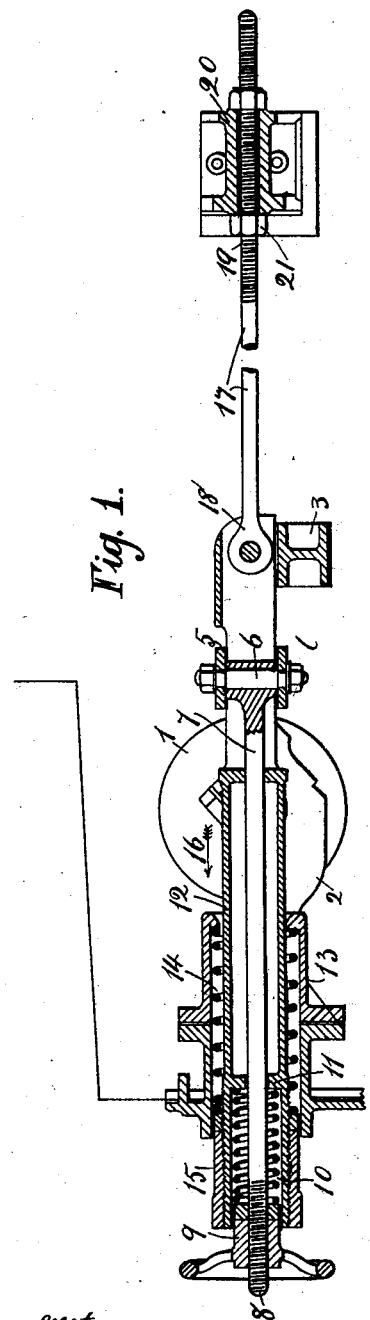
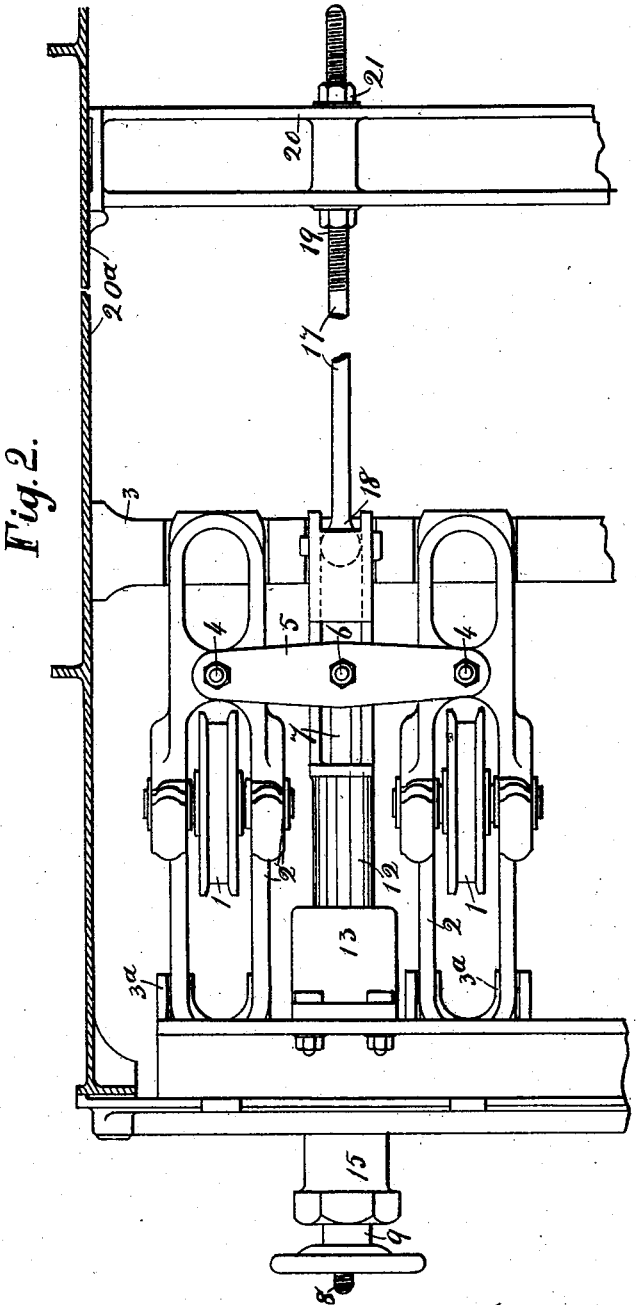

Witnesses
W B Johnson
F Bennett

Inventors
Thomas Vicars
John Vicars the Y.

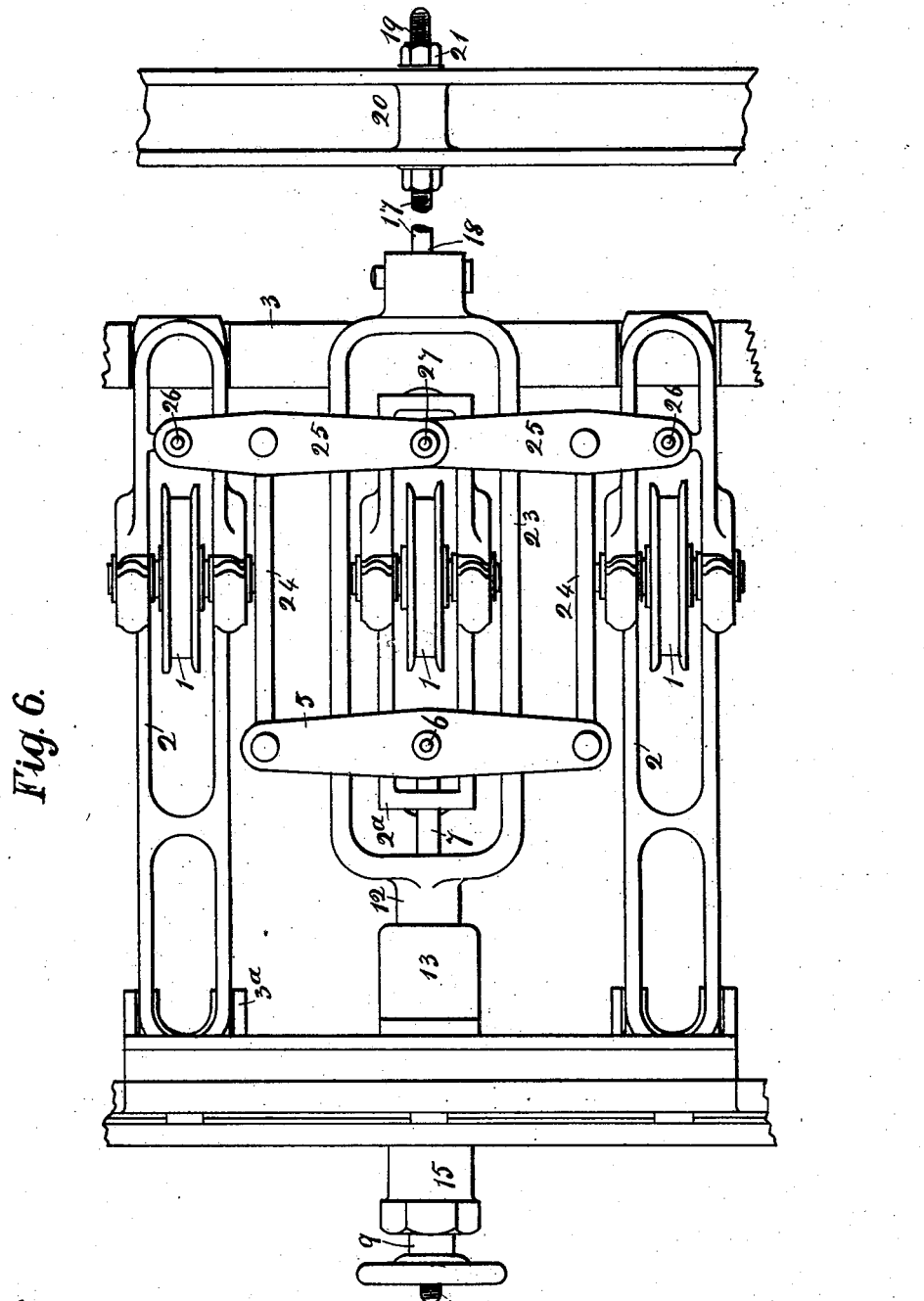

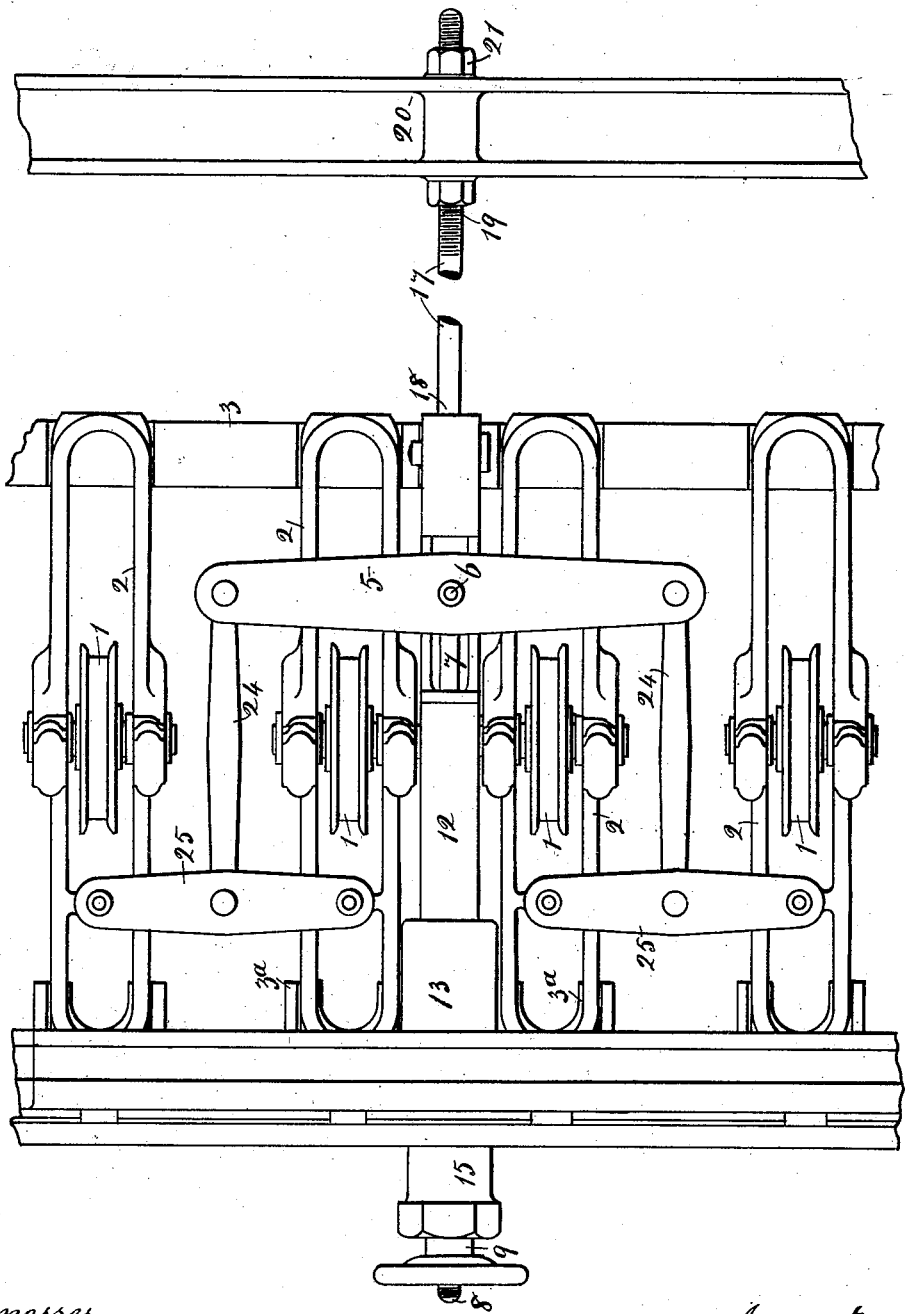

No. 755,194. PATENTED MAR. 22, 1904.
T. VICARS & J. VICARS, THE YOUNGER.
TRAVELING OVEN.
APPLICATION FILED SEPT. 15, 1903.
NO MODEL.
5 SHEETS—SHEET 5.
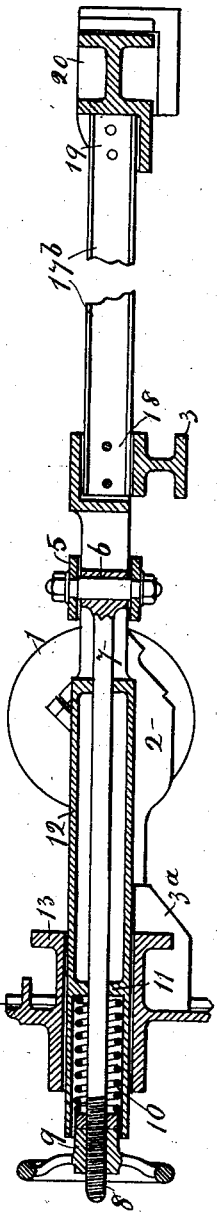
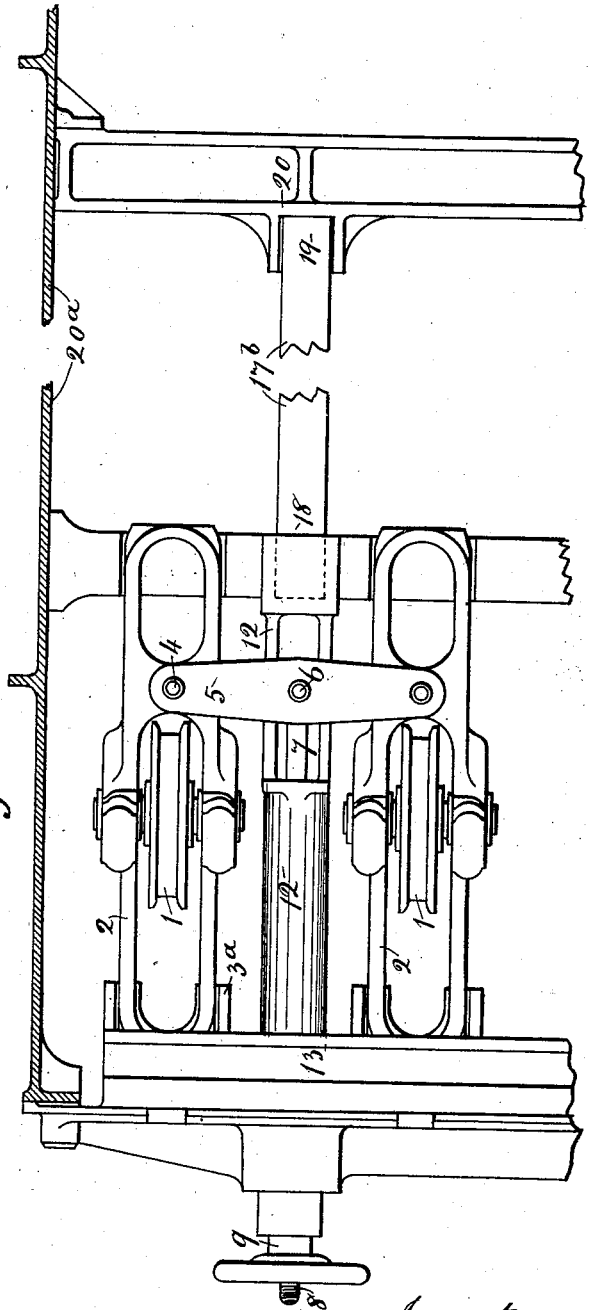
Witnesses
M B Johnson
F Bennett
Inventors
Thomas Vicars
John Vicars the Y.

No. 755,194. Patented March 22, 1904.

UNITED STATES PATENT OFFICE.

THOMAS VICARS AND JOHN VICARS, THE YOUNGER, OF EARLESTOWN, ENGLAND.

TRAVELING OVEN.

SPECIFICATION forming part of Letters Patent No. 755,194, dated March 22, 1904.

Application filed September 15, 1903. Serial No. 173,338. (No model.)

*To all whom it may concern:*

Be it known that we, THOMAS VICARS and JOHN VICARS, the younger, subjects of the King of Great Britain, residing at Earlestown, in the county of Lancaster, England, have invented new and useful Improvements in or Connected with Traveling Ovens, of which the following is a specification.

The invention relates to ovens which have endless traveling chains for carrying the pans; and the object is to provide appliances whereby the tension on each of the chains carrying a pan or series of pans may be regulated or balanced, so that one chain is not under greater strain or tension than another, and so as to prevent undue strain being put upon any chain, and whereby the expansion or contraction of the chains by variation of temperature shall be automatically compensated. We attain these objects by appliances such as are illustrated on the accompanying drawings, on which—

Figure 3:
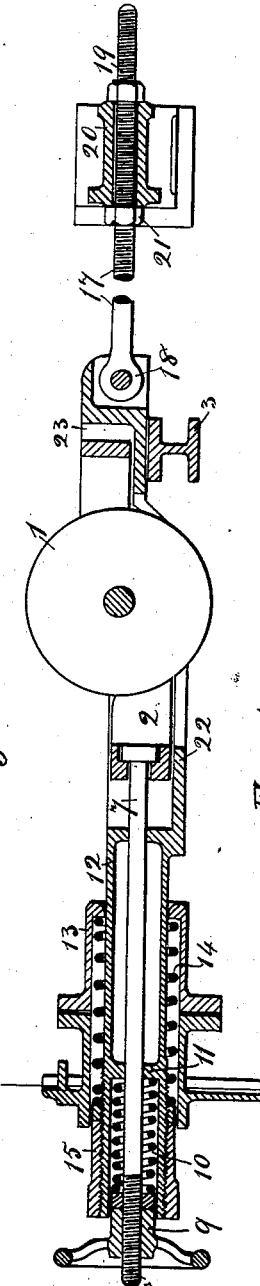

Figure 1 is a central longitudinal section, and Fig. 2 a plan, of one form of appliances for balancing and compensating expansion of two oven-chains. Fig. 3 is a central longitudinal section, and Fig. 4 a plan, of an arrangement for compensating expansion of one chain. Fig. 5 is a sectional view similar to Fig. 1, but with weighted levers instead of springs. Fig. 6 is a plan of an arrangement for balancing and compensating expansion of three chains by one expansion-bar and connections. Fig. 7 is a plan of an arrangement similar to Fig. 3, but applied to four chains. Figs. 8 and 9 are a central longitudinal section and a plan, respectively, similar to Figs 1 and 2, but with the expansion-bar as a rigid girder.

Like numerals of reference indicate similar parts in all the views.

Referring to Figs. 1 and 2, 1 represents the usual chain-pulleys, around which the oven-chains pass. 2 represents the usual sliding supports for the pulleys 1, free to slide on bars or brackets 3 3ª, connected to the framework of the oven. The supports 2 are connected by pins or pivots 4 to the ends of a balance lever or arm 5, the center of which is connected by a pin 6 to a rod 7, the outer end 8 of which is screwed and provided with an adjustable nut 9, bearing against a spring 10, the other end of which bears against a collar or projection 11 on a sleeve or bar 12, so that the balance-lever is pulled toward the outer end of the sleeve, thus maintaining the tension of the oven-chains with regard to the sleeve 12. The sleeve 12 is free to slide on the bar 3 and in a support 13, attached to the oven or to the ground, as desired. 14 is a spring bearing at one end against the support 13 and at the other against a nut or collar 15, adjustable by a screw or otherwise upon the sleeve 12, so that the sleeve tends to be moved outwardly in the direction of the arrow 16. Such outward motion is, however, limited by a rod or bar 17, made, preferably, of similar material to the chains, so as to expand equally with the chains by variation of temperature. The rod 17 is attached at one end, 18, to the sleeve 12 and extends through the oven in about the same position as the chains, so that it is exposed to the same temperatures. The rod 17 is also of about the same length as the chains and is secured at its other end, 19, to a bar 20, attached to the oven or framework 20ª. 21 represents nuts for adjusting the rod 17 longitudinally. A chain, wire rope, or other suitable tensile element might be used in place of the rod 17. By the above arrangements as the oven-chains expand by heat the rod 17 also expands equally and allows the sleeve or bar 12 to be moved outwardly by the spring 14, thus through the spring 10, rod 7, and balance-lever 5 maintaining a uniform tension on the chains, notwithstanding that the temperature in the oven may vary, or even when the oven is allowed to get cold no excessive strain is put upon the spring connections.

Figure 4:
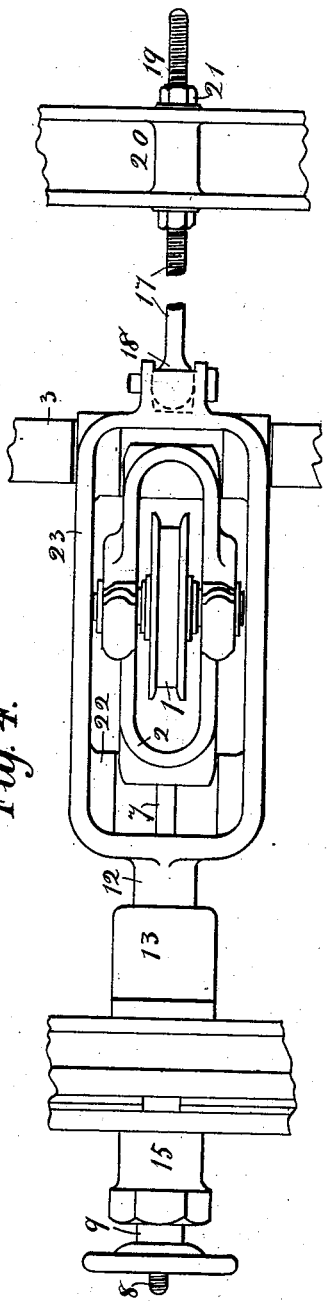
Figure 5:
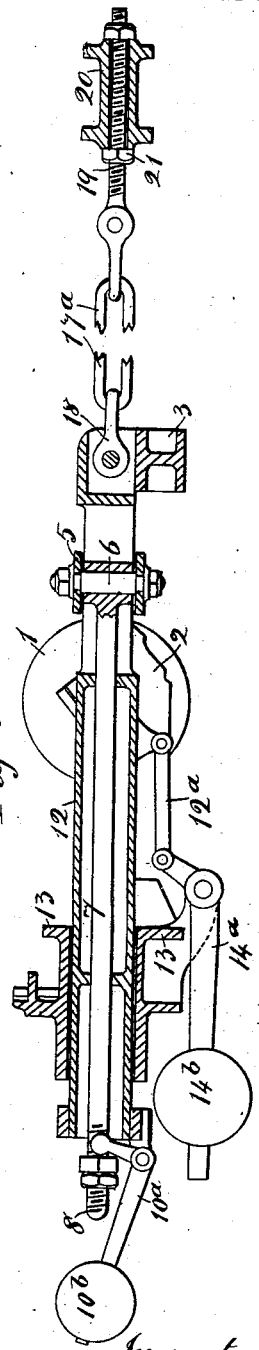

Referring to Figs. 3 and 4, in this case an independent sleeve, with its spring connections and tension-rod, are used for each oven-chain. The construction and operation are similar to Figs. 1 and 2, except that there is no balance-lever and the chain-pulley support 2 rests and moves on slides 22, carried by a yoke 23, attached at one end to the sleeve 12, and supported at the other by the bar 3. The tension-rod 17 is attached at one end, 18, to the yoke 23, and the rod 7 is connected direct to the sliding chain-wheel support 2.

Referring to Fig. 5, instead of using springs for maintaining the tension on the chains weights or weighted levers may be used, and here the sleeve 12 is shown connected by a link $12^a$ to one arm of a bell-crank lever $14^a$, pivoted to the sleeve-support 13, the other arm of the lever having a weight $14^b$, which tends to move the sleeve outwardly. $10^a$ is a bell-crank lever pivoted to the outer end of the sleeve 12 and having one arm connected to the rod 7 of the chain-pulley support, the other arm being weighted at $10^b$, so that the chain-pulleys tend to move outwardly in relation to the sleeve. In this view the compensating tension element is shown as a chain $17^a$ instead of a solid rod.

Instead of one tension-rod, sleeve, and spring connection being used for each oven-chain or pair of chains a larger number of chains or pairs of chains may be compensated by one tension-rod, &c., and referring to Fig. 6, which is a plan for regulating or balancing three chains, the two outer wheel-supports 2 slide on bars 3 $3^a$, as in Figs. 1 and 2, and the center support $2^a$ slides on the yoke 23, as in Figs. 3 and 4. The rod 7 is connected to a balance-lever 5, as in Figs. 1 and 2, the spring connection being the same. The ends of the lever 5 are connected by links 24 to secondary unequal armed balance-levers 25, the ends of the shorter arms of which are connected by pins 26 to the outer chain-pulley supports, while the longer arms of the levers 25 are connected by a pin 27 to the center chain-pulley support. By this arrangement, the proportion of the arms of the levers 25 being two to one uniform tension is maintained on all the three oven-chains. The compensating arrangement is the same as in Figs. 1 and 2.

Referring to Fig. 7, this is a plan whereby four chains are regulated from one tension-rod, spring connection, &c. The arrangement is similar to Fig. 6, except that the equal arms of the secondary balance-levers 25 are each connected to a separate chain-pulley support 2, all sliding upon bars 3 $3^a$. Any desired number of chains may be thus regulated from one tension-rod by using suitable multiple balance-levers or equivalent devices to transmit the tension of the adjustable spring connections between the chain-pulley supports 2 and the sleeve or bar 12.

Referring to Figs. 8 and 9, instead of using a tension-rod and spring or weight for regulating the movement of the sleeve or bar 12 in all the above-described arrangements such sleeve might be attached to or formed as part of a bar, girder, or tube of such dimensions as not to be deflected laterally by the tension on the oven-chains. The bar, girder, or tube will thus be in compression instead of in tension, as before described for the rod 17. The arrangement in these views is for a pair of chains, and the construction and operation of the parts are similar to Figs. 1 and 2, except that the tension-rod 17 in Figs. 1 and 2 is replaced by a bar $17^b$, one end, 18, of which is secured to the sleeve 12, while the other end, 19, is secured to the bar 20 near the other end of the oven, the bar $17^b$ extending through the oven, as described for the rod 17 above, so that as the chains expand by heat the bar $17^b$, being preferably of similar material, likewise expands to about the same extent, thus forcing the sleeve 12 outwardly through the support 13. The spring 14, described under Figs. 1 and 2, therefore not being necessary is dispensed with. The arrangement of balance-lever 5, rod 7, and adjustable spring connection 10 is the same as under Figs. 1 and 2, or the weighted lever $10^a$, as under Fig. 5, might be used instead of the spring 10.

It is to be observed that when the before-mentioned rod 17 or other tensile element or the bar, girder, tube, or other element in compression are made of material of greater expansibility by heat than the oven-chains such rod, bar, &c., need not extend the whole length of the oven, but only so far as that the expansion will be about equal to that of the oven-chains.

Set-screws, nuts, catches, or other motion-limiting devices may be used where necessary to limit the motion of the chain-pulleys, spring adjustments, or other parts to prevent undue strain being accidentally put on the chains. For instance, the outer ends of the sleeve 12 and rod 7 are only screwed a certain length, so that the nuts 15 and 9 cannot be screwed in so far as to cause excessive compression of the springs 14 and 10.

We do not confine ourselves to the precise details of constructions or arrangements of parts above described, as it will be obvious many modifications may be made without departing from the nature of the invention so long as a rod, chain, bar, or the like having an expansion approximately uniform with that of the oven-chains is used, such bar or rod being attached to or formed with a sleeve or bar which is attached through a spring or yielding connection to the chain-pulley supports.

We claim—

1. In combination with a traveling oven an expansible device extending into the oven and fixed at one end therein and at the other end connected to the movable chain-pulley slides, substantially as described.

2. In combination with a traveling oven an expansible device extending into the oven and fixed at one end therein and at the other end connected by a balance-lever to the movable chain-pulley slides substantially as described.

3. In combination with a traveling oven an expansible device extending into the oven and fixed at one end therein a balance-lever connected to the movable chain-pulley slides, and a tension device connecting the balance-lever to the expansible device substantially as described.

4. In combination with a traveling oven an expansible device extending into the oven and fixed at one end therein and at the other end connected to the movable chain-pulley slides, and a tension device adapted to draw the expansible device outwardly substantially as described.

In testimony whereof we have signed our names to this specification in the presence of two subscribing witnesses.

THOMAS VICARS.
JOHN VICARS, THE YOUNGER.

Witnesses:
W. B. JOHNSON,
F. BENNETT.